US012677291B2

(12) United States Patent
Du et al.

(10) Patent No.: US 12,677,291 B2
(45) Date of Patent: Jul. 7, 2026

(54) DOWNLINK CHANNEL QUALITY ASSESSMENT AT USER EQUIPMENT

(71) Applicant: Nokia Technologies Oy, Espoo (FI)

(72) Inventors: Lei Du, Beijing (CN); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 18/682,430

(22) PCT Filed: Aug. 9, 2021

(86) PCT No.: PCT/CN2021/111419
§ 371 (c)(1),
(2) Date: Feb. 8, 2024

(87) PCT Pub. No.: WO2023/015403
PCT Pub. Date: Feb. 16, 2023

(65) Prior Publication Data
US 2025/0119918 A1 Apr. 10, 2025

(51) Int. Cl.
*H04W 72/23* (2023.01)
*H04B 17/309* (2015.01)
*H04W 24/08* (2009.01)
*H04W 24/10* (2009.01)
*H04W 72/542* (2023.01)

(52) U.S. Cl.
CPC ........... *H04W 72/23* (2023.01); *H04W 24/08* (2013.01)

(58) Field of Classification Search
None
See application file for complete search history.

(56) References Cited

U.S. PATENT DOCUMENTS

2009/0296864 A1* 12/2009 Lindoff ................ H04B 17/336
375/357
2015/0245375 A1* 8/2015 Li ......................... H04L 5/0048
370/329
2017/0347365 A1* 11/2017 Xu .................... H04W 36/0066
(Continued)

FOREIGN PATENT DOCUMENTS

EP          3800933 A1     4/2021
WO     2017/136666 A1     8/2017
WO     2021/115198 A1     6/2021

OTHER PUBLICATIONS

"3rd Generation Partnership Project; Technical Specification Group Radio Access Network; NR; Physical layer procedures for control (Release 16)", 3GPP TS 38.213, V16.6.0, Jun. 2021, pp. 1-187.
(Continued)

*Primary Examiner* — Duc T Duong
(74) *Attorney, Agent, or Firm* — Barta Jones, PLLC

(57) ABSTRACT

A user equipment comprising means for: determining an evaluation period, wherein the determined evaluation period can be at least a first evaluation period, a second evaluation period or a third evaluation period; and performing downlink channel quality assessment comprising performing downlink measurements during the determined evaluation period, wherein the second evaluation period has a longer duration than the first evaluation period and the wherein the third evaluation period has a shorter duration than the second evaluation period.

20 Claims, 6 Drawing Sheets

(56)        References Cited

U.S. PATENT DOCUMENTS

2019/0261244 A1*  8/2019  Jung ........................ H04L 1/20
2020/0267690 A1   8/2020  Hsieh et al.
2022/0150901 A1*  5/2022  Wyville ................. H04B 1/109
2023/0231605 A1*  7/2023  Fröberg Olsson .... H04L 1/0003
                                               370/329

OTHER PUBLICATIONS

"3rd Generation Partnership Project; Technical Specification Group Radio Access Network; NR; Requirements for support of radio resource management (Release 17)", 3GPP TS 38.133, V17.2.0, Jun. 2021, 3177 pages.
"WF on RLM/BFD relaxation for UE Power Saving enhancements", 3GPP TSG-RAN WG4 Meeting #99-e, R4-2108351, Agenda: 9.13, MediaTek, May 19-27, 2021, 10 pages.
International Search Report and Written Opinion received for corresponding Patent Cooperation Treaty Application No. PCT/CN2021/111419, dated Apr. 25, 2022, 8 pages.
"Discussion on RLM/BFD relaxation for NR power saving enhancement", 3GPP TSG-RAN WG4 Meeting # 99-e, R4-2109494, Agenda: 9.13.2, CMCC, May 19-27, 2021, 9 pages.
"Discussion on UE measurement relaxation for RLM and/or BFD", 3GPP TSG-RAN WG4 Meeting # 98-e, R4-2101542, Agenda: 11.9.2, OPPO, Jan. 25-Feb. 5, 2021, pp. 1-3.
"Further discussion on UE measurements relaxation for RLM and/or BFD", 3GPP TSG-RAN WG4 Meeting #100-e, R4-2112413, Agenda: 9.14.2, Xiaomi, Aug. 16-27, 2021, 5 pages.
"Discussion about RLM/BFD measurement relaxation", 3GPP TSG-RAN WG4 Meeting#100-e, R4-2112878, Agenda: 9.14.2, Nokia, Aug. 16-27, 2021, 9 pages.
Extended European Search Report received for corresponding European Patent Application No. 21953042.5, dated May 16, 2025, 10 pages.
"Discussion on CSI-RS Based Measurement Performance for NR Mobility", 3GPP TSG-RAN WG4 Meeting #92bis, R4-1911921, Agenda: 8.16.1.1, Huawei, Oct. 14-18, 2019, 5 pages.

* cited by examiner

20_2

>Threshold1

Second

<Threshold 1 &
>Threshold 2          >Threshold1

20_3

<Threshold 1 &
>Threshold 2          Third

<Threshold 1 &
>Threshold 2          <Threshold 2

20_1

<Threshold 2          First 24
fixed number of measurements

22_2

>Threshold1

<Threshold 2

22_3

22_1

22
Increasing duration of
evaluation period

502

502
Determining an evaluation period

504
Determining an evaluation period

DOWNLINK CHANNEL QUALITY ASSESSMENT AT USER EQUIPMENT

RELATED APPLICATION

This application was originally filed as PCT Application No. PCT/CN2021/111419, filed on Aug. 9, 2021, of which is incorporated herein by reference in its entirety.

TECHNOLOGICAL FIELD

Embodiments of the present disclosure relate to downlink channel quality assessment at user equipment.

BACKGROUND

User equipment can perform downlink channel quality assessment by performing downlink measurements that are used to assess quality of the downlink.

In 3GPP, this can be used for radio link monitoring (RLM) and also for beam failure detection (BFD).

It would be desirable to improve downlink channel quality assessment.

BRIEF SUMMARY

According to various, but not necessarily all, embodiments there is provided a user equipment comprising means for:

determining an evaluation period, wherein the determined evaluation period can be at least a first evaluation period, a second evaluation period or a third evaluation period; and performing downlink channel quality assessment comprising performing downlink measurements during the determined evaluation period, wherein the second evaluation period has a longer duration than the first evaluation period and the wherein the third evaluation period has a shorter duration than the second evaluation period.

In some but not necessarily all examples, the third evaluation period has a longer duration than the first evaluation period and/or fewer measurements within an evaluation period than the first evaluation period and/or the second evaluation period. In some but not necessarily all examples, the user equipment is configured to determine the evaluation period in dependence upon downlink channel quality.

In some but not necessarily all examples, the user equipment is configured to determine the evaluation period in dependence upon a previously performed downlink channel quality assessment.

In some but not necessarily all examples, the user equipment is, configured to determine downlink channel quality by comparing downlink measurements against multiple thresholds.

In some but not necessarily all examples, the user equipment comprises means for determining the evaluation period as the second evaluation period when the downlink channel has a highest quality, as the first evaluation period when the downlink channel has a lowest quality and as the third evaluation period when the downlink channel has an intermediate channel quality that is between the highest quality and the lowest quality.

In some but not necessarily all examples, the user equipment comprises means for determining the evaluation period as the second evaluation period in dependence upon the downlink measurement passing a first quality threshold for the downlink measurement;

determining the evaluation period as the first evaluation period in dependence upon the downlink measurement failing a second quality threshold for the downlink measurement;

determining the evaluation period as the third evaluation period in dependence upon the downlink measurement failing the first quality threshold for the downlink measurement and passing the second quality threshold for the downlink measurement.

In some but not necessarily all examples, the determined evaluation period changes from the first evaluation period to the second evaluation period when downlink channel quality rises above a first threshold and remains the second evaluation period while downlink channel quality remains above the first threshold and the determined evaluation period changes from the second evaluation period to the third evaluation period when the downlink channel quality falls below the first threshold. In some but not necessarily all examples, the user equipment is configured to prevent determining the evaluation period as the third evaluation period during the first evaluation period.

In some but not necessarily all examples, the first evaluation period has a shorter duration, the second evaluation period has a longer duration, and the third evaluation period has an intermediate duration between the longer duration and the shorter duration.

In some but not necessarily all examples, the user equipment comprises means for:

determining a number of downlink measurements for an evaluation period;

determining a duration for an evaluation period for performing the determined number of downlink measurements;

wherein performing the downlink channel quality assessment comprises performing the determined number of downlink measurements during the determined duration of the evaluation period, wherein the third evaluation period has a longer duration than the first evaluation period and/or fewer measurements than the first evaluation period and/or the second evaluation period.

In some but not necessarily all examples, the user equipment is configured to:

use a longer duration based on downlink channel quality exceeding a first threshold; use a shorter duration based on downlink channel quality not exceeding a second threshold, lower than the first threshold;

use an intermediate duration based on downlink channel quality exceeding the second threshold but not exceeding the first threshold.

In some but not necessarily all examples, the user equipment is configured to: use a number of downlink measurements based on downlink channel quality exceeding a first threshold;

use a different, smaller number of downlink measurements based on downlink channel quality not exceeding the first threshold but exceeding a second threshold, lower than the first threshold.

According to various, but not necessarily all, embodiments there is provided a method comprising:

determining an evaluation period, wherein the determined evaluation period can be at least a first evaluation period, a second evaluation period or a third evaluation period; and performing downlink channel quality assessment comprising performing downlink measurements during the determined evaluation period, wherein the second evaluation period has a longer duration than the first evaluation period wherein the third evaluation period has a shorter duration than the second evaluation period.

According to various, but not necessarily all, embodiments there is provided a computer program comprising program instructions for causing an apparatus to perform at least the following:

determining an evaluation period, wherein the determined evaluation period can be at least a first evaluation period, a second evaluation period or a third evaluation period; and performing downlink channel quality assessment comprising performing downlink measurements during the determined evaluation period, wherein the second evaluation period has a longer duration than the first evaluation period wherein the third evaluation period has a shorter duration than the second evaluation period.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
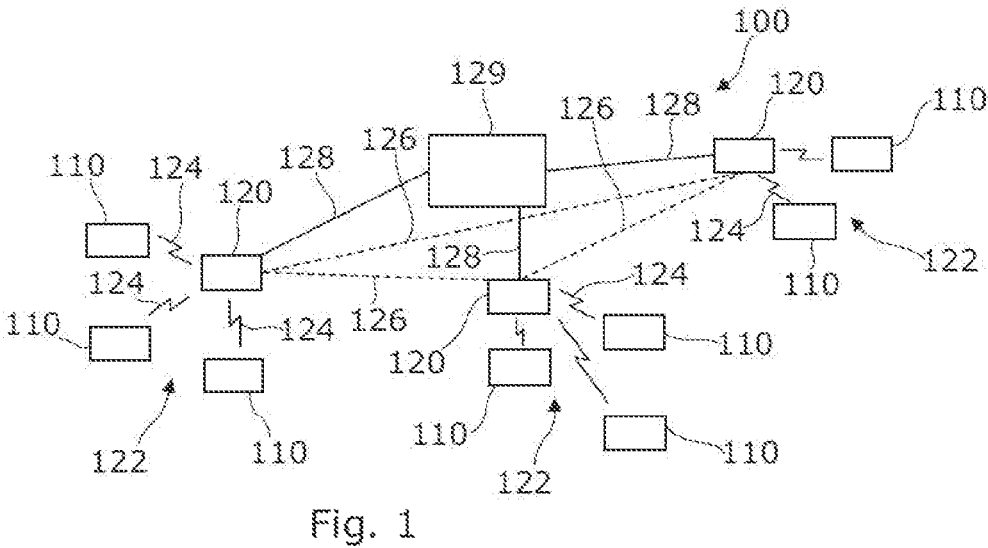
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

A user equipment comprises a mobile equipment. Where reference is made to user equipment that reference includes and encompasses, wherever possible, a reference to mobile equipment.

Figure 2:
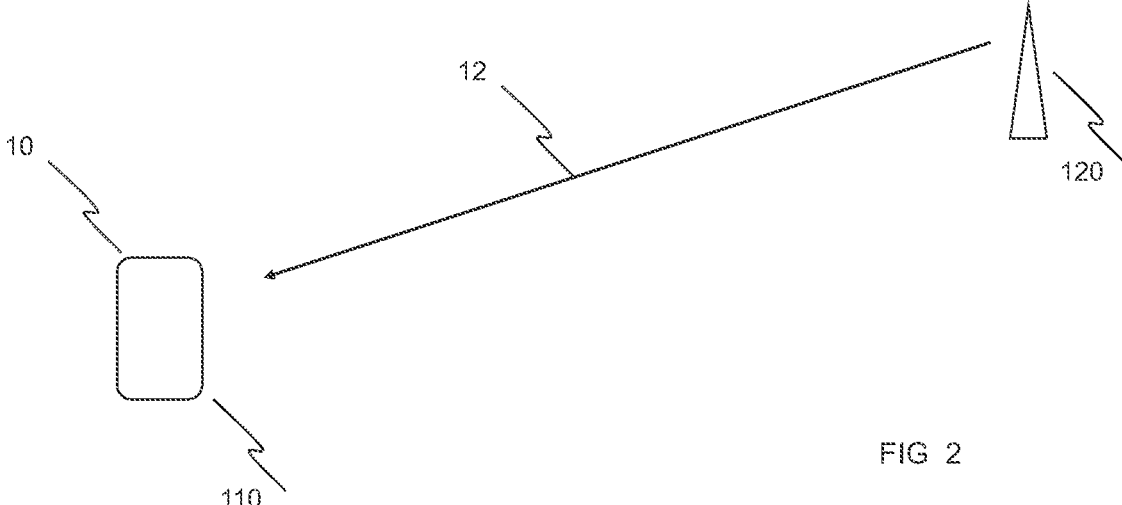
FIG. 2 shows another example of the subject matter described herein.

FIG. 2 illustrates an example of a downlink channel 12 from an access node 120 to a an apparatus 10, which is a terminal node 110. In 3GPP NR, the access node 120 can be a gNB, the apparatus 10 can be user equipment and the downlink channel 12 can be a downlink radio link.

The apparatus 10 is configured to perform downlink channel quality assessment comprising performing downlink measurements that are used to assess quality of the downlink channel.

Figure 3:
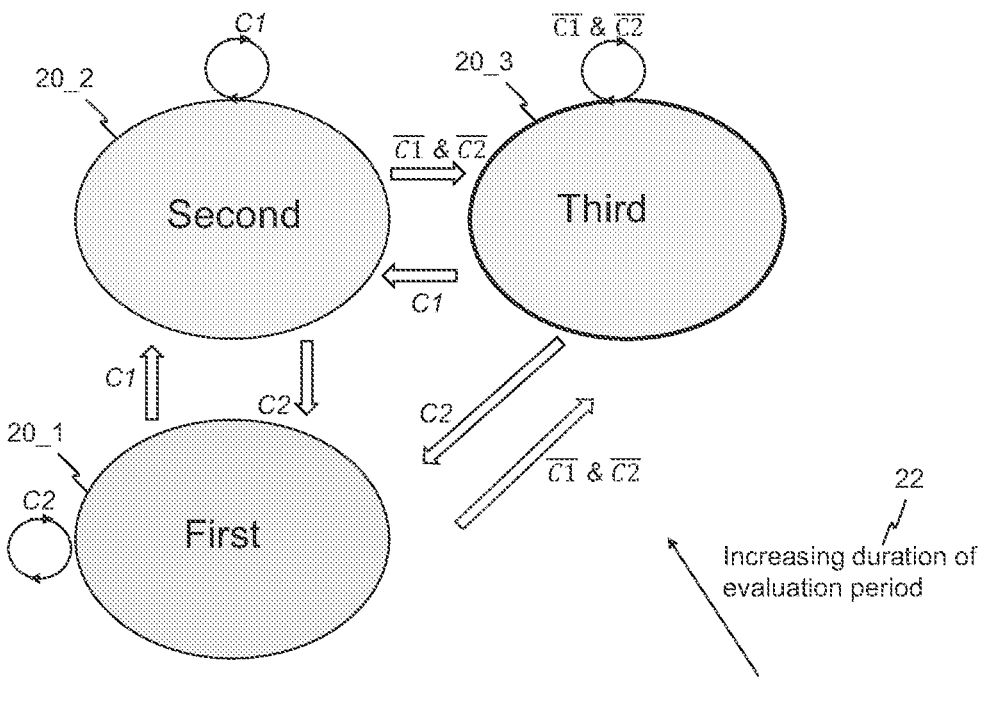
FIG. 3 shows another example of the subject matter described herein.

FIG. 3 illustrates an example of how the apparatus 10 controls performance of downlink channel quality assessment.

The downlink channel quality assessment comprises performing downlink measurements during a determined evaluation period 20.

The apparatus 10 determines the evaluation period 20. The determined evaluation period 20 can be at least a first evaluation period 20_1, a second evaluation period 20_2 or a third evaluation period 20_3.

In the example illustrated, there are three available evaluation periods 20. However, in other examples there can be more than three evaluation period 20 available.

The second evaluation period 20_2 has a longer duration 22 than the first evaluation period 20_1 and the third evaluation period 20_3 has a shorter duration 22 than the second evaluation period 20_2.

An evaluation period 20 can be defined by a duration 22 and a number of measurements 24. The number of measurements 24 is the quantity of measurements used for downlink channel quality assessment for that evaluation period 20. The duration 22 is a length of time that an evaluation period 20 lasts. When evaluation periods 20 are consecutive, the duration 22 represents how often downlink channel quality assessment occurs. However, the assessments can be performed over fixed windows or sliding windows of duration 22.

The first evaluation period 20_1 has a first duration 22_1 and a first number of measurements 24_1. The second evaluation period 20_2 has a second duration 22_2 and a second number of measurements 24_2. The third evaluation period 20_3 has a third duration 22_3 and a third number of measurements 24_3.

The second duration 22_2 is longer than the first duration 22_1 and the third duration 22_3 is shorter than the second duration 22_2.

The third duration 22_3 can be the same as, shorter or longer than the first duration 22_1. In at least some of the following examples, the third duration 22_3 is shorter than the second duration 22_2 and longer than the first duration 22_1.

Figures 7, 8:
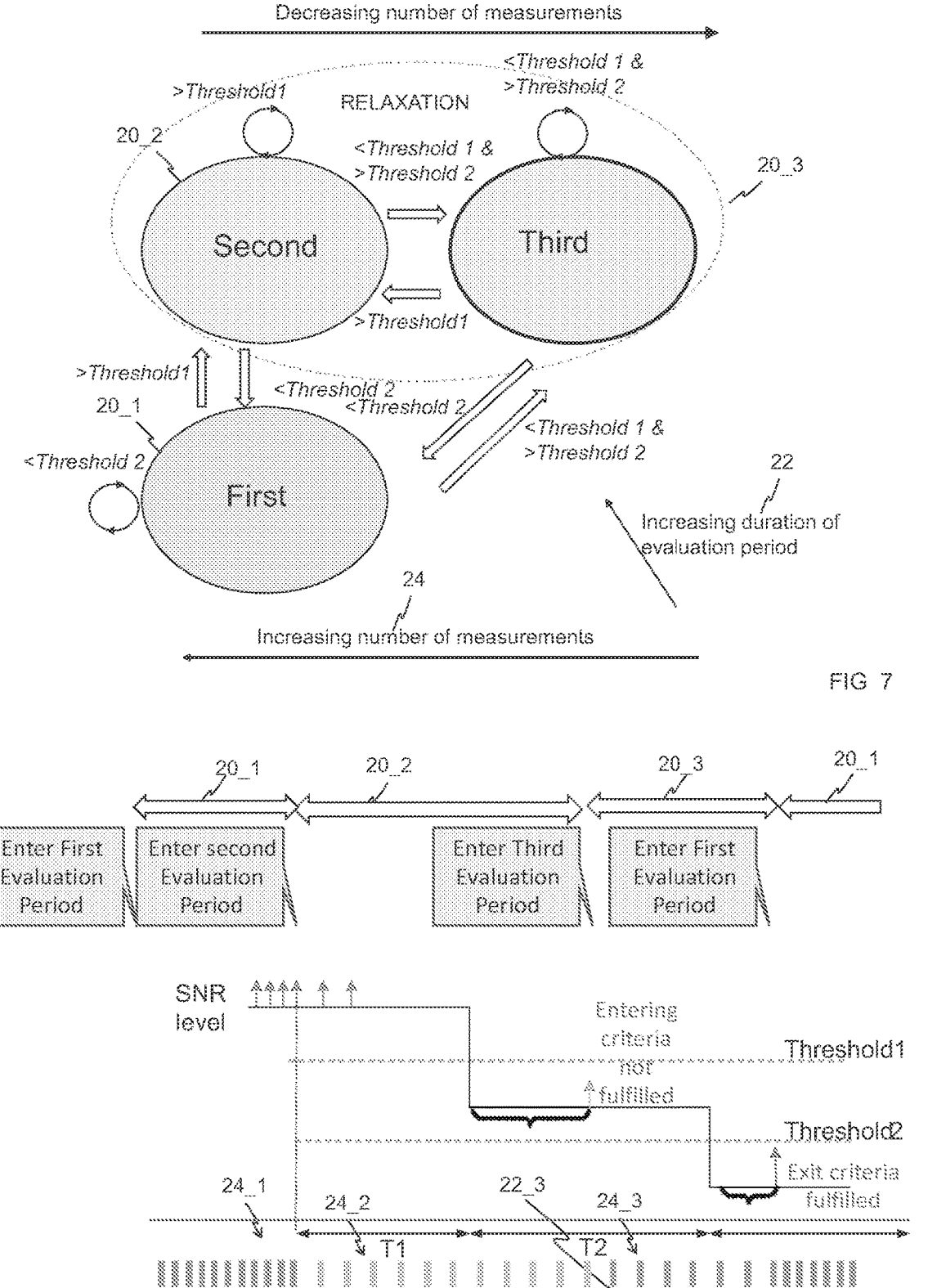
FIG. 7 shows another example of the subject matter described herein.
FIG. 8 shows another example of the subject matter described herein.
Figures 9, 10:
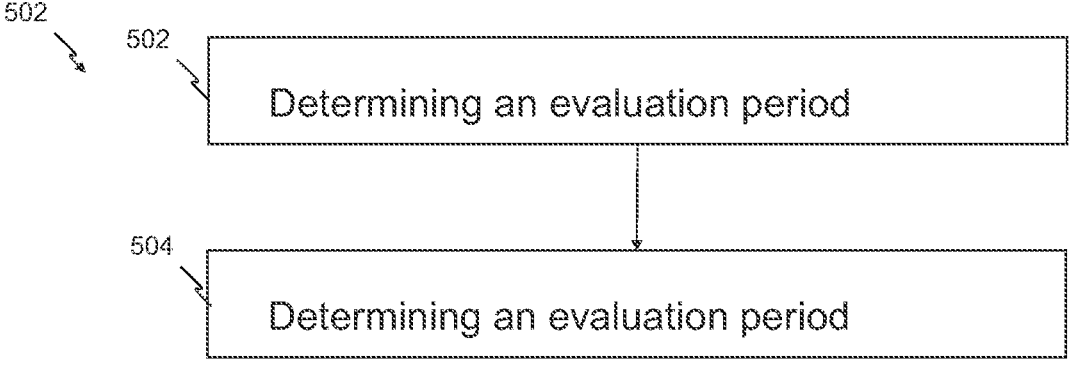
FIG. 9 shows another example of the subject matter described herein.
FIG. 10 shows another example of the subject matter described herein.

In some but not necessarily all examples, the first number of measurements 24_1, the second number of measurements 24_2 and the third number of measurements 24_3 are the same (FIG. 9). In other examples, some or all of the first number of measurements 24_1, the second number of measurements 24_2 and the third number of measurements 24_3 are the different (FIG. 7). For example, in some examples, the second number of measurements 24_2 is larger than the third number of measurements 24_3 (FIG. 7).

Thus in at least some examples, the third evaluation period 20_3 has a longer duration 22_3 than the duration 22_1 of the first evaluation period 20_1 and/or fewer measurements than the first evaluation period 20_1 and/or the second evaluation period 20_2.

The evaluation period 20 can be determined in dependence upon downlink channel quality. The apparatus 10 performs a number of measurements 24 over a duration 22 of the evaluation period 20 and based on these measurements the apparatus 10 assesses the channel quality.

For example, a next evaluation period can be determined at a current evaluation period 20_i in dependence upon downlink channel quality that is assessed according to the current evaluation period 20_i using the number of measurements 24_i and the duration 22_i. The current evaluation period 20 can therefore have been determined in dependence upon a previously performed downlink channel quality assessment such as the downlink channel quality assessment performed for the immediately preceding evaluation period.

The number 24_i of measurements could, for example be performed with a fixed periodicity within the duration 22_i or performed consecutively at the beginning, end or at any point of time within the duration 22_i or performed according to another fixed or arbitrary pattern of timings.

There is a transition from using the first evaluation period 20_1 to using the second evaluation period 20_2 when a first condition C1 is satisfied.

There is a transition from using the second evaluation period 20_2 to using the first evaluation period 20_1 when a second condition C2 is satisfied.

The first evaluation period 20_1 remains in use while second condition C2 remains satisfied.

The second evaluation period 20_2 remains in use while the first condition C1 remains satisfied.

There is a transition from using the second evaluation period 20_2 to using the third evaluation period 20_3 when both the first condition C1 is not satisfied and the second condition C2 is not satisfied.

There is a transition from using the third evaluation period 20_3 to using the second evaluation period 20_2 when the first condition C1 is satisfied.

There is a transition from using the third evaluation period 20_3 to using the first evaluation period 20_1 when the second condition C2 is satisfied.

There is a transition from using the first evaluation period 20_1 to using the third evaluation period 20_3 when both the first condition C1 is not satisfied and the second condition C2 is not satisfied.

The third evaluation period 20_3 remains in use while both the first condition C1 remains unsatisfied and the second condition C2 remains unsatisfied.

Thus, first evaluation period 20_1 is used or remains in use when the second condition C2 is satisfied; the second evaluation period 20_2 is used or remains in use when the first condition C1 is satisfied; and the third evaluation period 20_3 is used or remains in use when both the first condition C1 is not satisfied AND the second condition C2 is not satisfied.

There is no transition from using the second evaluation period 20_2 to using the first evaluation period 20_1 in response to the first condition C1 no longer being satisfied. An additional condition needs to be met for a transition to the third evaluation period 20_3 (notC1 & notC2) or for a transition to the first evaluation period 20_1 (C2).

Figure 4:
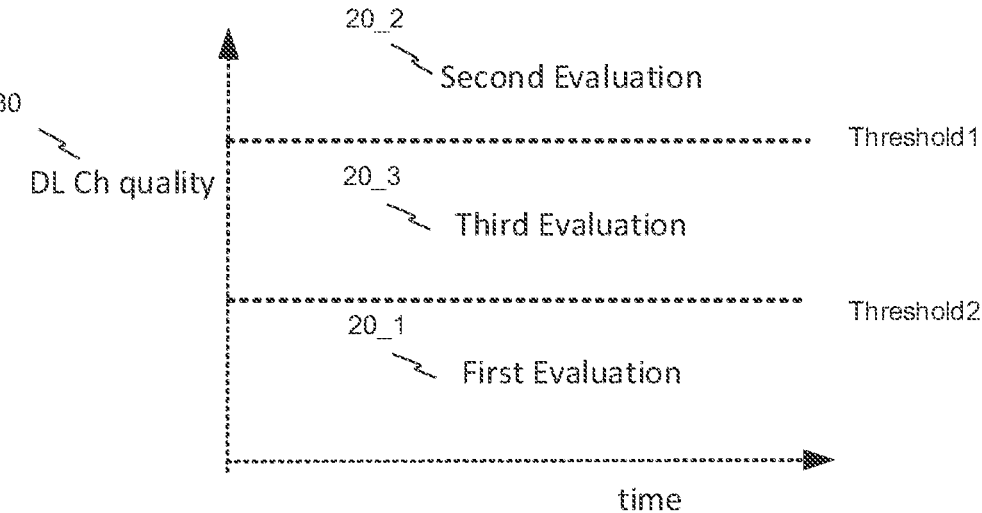
FIG. 4 shows another example of the subject matter described herein.

Referring to FIG. 4, the first condition C1 can be based on exceeding a downlink channel quality assessment criterion. For example, the condition C1 can be satisfied when the downlink channel quality assessment is above a first threshold (Threshold1 in FIG. 4). For example, the condition C1 can be satisfied when the downlink channel quality assessment is above a first threshold (Threshold1 in FIG. 4) for a defined time period. The second condition C2 can be based on not exceeding a downlink channel quality assessment criterion. For example, the condition C2 can be satisfied when the downlink channel quality assessment is below a second threshold (Threshold2 in FIG. 4). For example, the condition C2 can be satisfied when the downlink channel quality assessment is below a second threshold (Threshold2 in FIG. 4) for a defined time period. The first threshold is for a higher downlink channel quality assessment than the second threshold.

Thus, the second evaluation period 20_2 is used when the downlink channel has a highest quality, the first evaluation period 20_1 is used when the downlink channel has a lowest quality and the third evaluation period 20_3 is used when the downlink channel has an intermediate channel quality that is between the highest quality and the lowest quality.

The apparatus 10 can determine downlink channel quality e.g. by comparing downlink measurements against the thresholds.

The apparatus 10 can determine the evaluation period as:
the second evaluation period 20_2 in dependence upon the downlink measurement passing a first quality threshold (>Threshold1) for the downlink measurement;
determine the evaluation period as the first evaluation period 20_1 in dependence upon the downlink measurement failing a second quality threshold for the downlink measurement (<Threshold2);
determine the evaluation period as the third evaluation period 20_3 in dependence upon the downlink measurement failing the first quality threshold for the downlink measurement and passing the second quality threshold for the downlink measurement (<Threshold1 & >Threshold2).

The measurement can be an instant measurement e.g. one SS-SINR to evaluate if the first threshold is fulfilled. This does not take into account the time of channel quality assessment.

The apparatus 10 can determine the evaluation period as:
the second evaluation period 20_2 in dependence upon the downlink channel quality assessment passing a first quality threshold (>Threshold1) for the channel quality assessment;
determine the evaluation period as the first evaluation period 20_1 in dependence upon the downlink channel quality assessment failing a second quality threshold for the downlink channel quality assessment (<Threshold2);
determine the evaluation period as the third evaluation period 20_3 in dependence upon the downlink channel quality assessment failing the first quality threshold for the downlink channel quality and passing the second quality threshold for the downlink channel quality assessment (<Threshold1 & >Threshold2).

The downlink channel quality assessment can use measurement results derived from the preceding evaluation period. This takes into account the assessment delay, for example, due to averaging e.g. 10 measurements.

Figure 5:
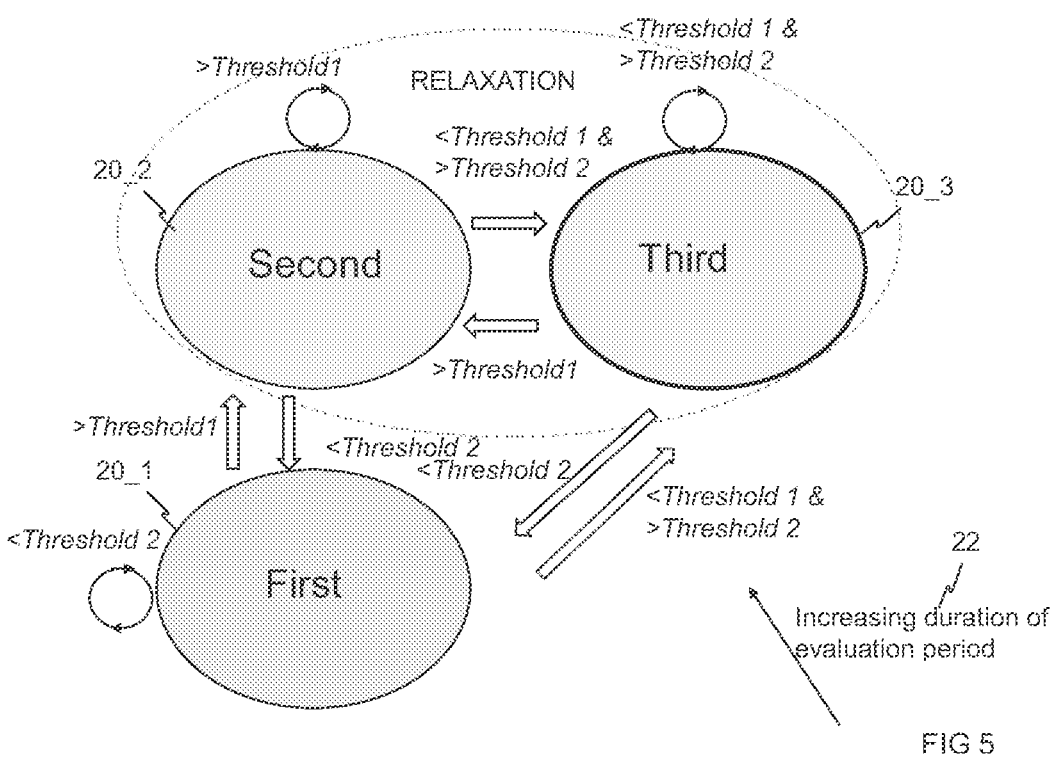
FIG. 5 shows another example of the subject matter described herein.

FIG. 5 illustrates the application of the threshold conditions illustrated in FIG. 4 to the state diagram illustrated in FIG. 3.

There is a transition from using the first evaluation period 20_1 to using the second evaluation period 20_2 when the downlink channel quality assessment is above a first threshold (Threshold1).

There is a transition from using the second evaluation period 20_2 to using the first evaluation period 20_1 when the downlink channel quality assessment is below a second threshold (Threshold2).

The first evaluation period 20_1 remains in use while the downlink channel quality assessment is below a second threshold (Threshold2).

The second evaluation period 20_2 remains in use while the downlink channel quality assessment is above the first threshold (Threshold1).

There is a transition from using the second evaluation period 20_2 to using the third evaluation period 20_3 when downlink channel quality assessment is both below the first threshold (Threshold1) and above the second threshold (Threshold2).

There is a transition from using the third evaluation period 20_3 to using the second evaluation period 20_2 when the downlink channel quality assessment is above the first threshold (Threshold1).

There is a transition from using the third evaluation period 20_3 to using the first evaluation period 20_1 when the downlink channel quality assessment is below the second threshold (Threshold2).

There is a transition from using the first evaluation period 20_1 to using the third evaluation period 20_3 when the downlink channel quality assessment is both below the first threshold (Threshold1) and above the second threshold (Threshold2).

The third evaluation period 20_3 remains in use while the downlink channel quality assessment remains both below the first threshold (Threshold1) and above the second threshold (Threshold2).

Thus, first evaluation period 20_1 is used or remains in use when the downlink channel quality assessment is below a second threshold (Threshold2); the second evaluation period 20_2 is used or remains in use when the downlink channel quality assessment is above the first threshold (Threshold1); and the third evaluation period 20_3 is used or remains in use when the downlink channel quality assessment is both below the first threshold (Threshold1) and above the second threshold (Threshold2).

There is no transition from using the second evaluation period 20_2 to using the first evaluation period 20_1 in response to the entry condition for the second evaluation period 20_2 (the downlink channel quality assessment is above a first threshold) no longer being satisfied. If the downlink channel quality assessment is below the first threshold, then the second threshold, evaluation period 20_2 transitions to the third evaluation period 20_3 if the downlink channel quality assessment is between the first and second thresholds and transitions to the first evaluation period 20_1 if the downlink channel quality assessment is below the second threshold. There is no automatic transition from using the second evaluation period 20_2 to using the first evaluation period 20_1 when downlink channel quality assessment is below the first threshold.

In some but not necessarily all examples, the transition from using the first evaluation period 20_1 to using the third evaluation period 20_3 is optional. In such examples, the third evaluation period 20_3 is entered from the second evaluation period 20_2 and not from the first evaluation period 20_1. Determining the evaluation period as the third evaluation period 20_3 during the first evaluation period 20_1 can therefore be prevented. The third evaluation period 20_3 can be entered via the second evaluation period 20_2 but cannot be entered from the first evaluation period 20_1. The third evaluation period 20_3 can only be entered via the second evaluation period 20_2.

The following features of FIGS. 3 and 5 are noteworthy.

The third evaluation period 20_3 can be entered via the second evaluation period 20_2.

When the entry criteria to enter the second evaluation period 20_2 is no longer satisfied, there is a transition to the third evaluation period 20_3. That is, there is a transition from using the first evaluation period 20_1 to using the second evaluation period 20_2 when a first condition is satisfied (e.g. channel quality assessment is above the first threshold) and there is a transition from using the second evaluation period 20_2 to using the third evaluation period 20_3 (not the first evaluation period 20_1) when the first condition is no longer satisfied (e.g. channel quality assessment has just fallen below the first threshold and but not yet fallen below the second threshold).

There is a transition from second evaluation period 20_2 to the third evaluation period 20_3 on failing to exceed the downlink channel quality assessment criteria used for transitioning from using the first evaluation period 20_1 to using the second evaluation period 20_2.

There is a transition from second evaluation period 20_2 to the third evaluation based on a combination of the criteria used to transition from using the first evaluation period 20_1 to using the second evaluation period 20_2 and criteria used to transition from using the second evaluation period 20_2 to using the first evaluation period 20_1. There is a transition from second evaluation period 20_2 to the third evaluation based on NOT (C1) & NOT (C2) which is a combination of the condition C1 used to transition from using the first evaluation period 20_1 to using the second evaluation period 20_2 and the condition C2 used to transition from using the second evaluation period 20_2 to using the first evaluation period 20_1. Referring to FIG. 5, there is a transition from using the second evaluation period 20_2 to using the third evaluation period 20_3 when the downlink channel quality assessment is below the first threshold and above the second threshold which is a combination, in the negative, of the downlink channel quality assessment being above the first threshold (used to transition from using the first evaluation period 20_1 to using the second evaluation period 20_2) and the downlink channel quality assessment being below the second threshold (used to transition from using the second evaluation period 20_2 to using the first evaluation period 20_1).

In at least some examples, using the second evaluation period 20_2 uses less power than the first evaluation period 20_1. In at least some examples, using the second evaluation period 20_2 uses less power than the first evaluation period 20_1 and using the third evaluation period 20_3 uses less power than the first evaluation period 20_1.

In at least some examples, the downlink measurements performed in the different evaluation period 20_i can be the same measurements of the same downlink channel. That is what is measured and how it is measured is consistent across the different evaluation periods 20_i. In at least some examples, the only changes concerning measurement between the different evaluation periods 20_i are duration 22_i and, optionally, the number of measurements 24_i.

Figure 6:
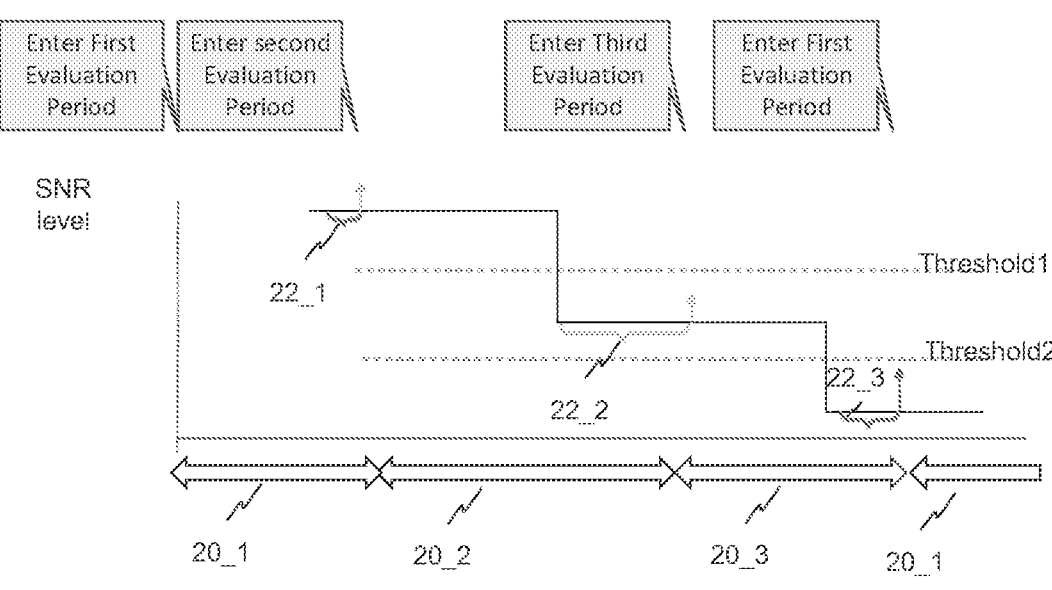
FIG. 6 shows another example of the subject matter described herein.

FIG. 6 illustrates a time-variation of the quality of the downlink channel and the response of the apparatus 10. In this example, the quality of the downlink channel is illustrated as signal to noise ratio (SNR). FIG. 6 can be used to explain operation of the state diagram illustrated in FIG. 5.

FIG. 6 does not illustrate assessed quality of the downlink channel. The assessed quality is obtained every evaluation period 20 based on a number 24 of measurements over a duration 22. The assessed quality is therefore discontinuous as it is assessed once every duration 22. Each determined evaluation period 20 can have a different duration 20. There is therefore a lag or latency, corresponding to the duration 22 of the current evaluation period 20, between the illustrated drop in the quality of the downlink channel and a transition between different evaluation periods 20. The assessment of the downlink channel quality can occur, for example, using sliding/overlapping windows or step-wise windows. In both cases there will be latency, although not the same latency.

During the first evaluation period 20_1, the downlink channel quality is assessed over the first duration 22_1 and first number of measurements 24_1 (not illustrated).

The determined evaluation period 20 changes from the first evaluation period 20_1 to the second evaluation period 20_2 in dependence upon the downlink channel quality rising above a first threshold and remains the second evaluation period 20_2 while downlink channel quality remains above the first threshold.

During the second evaluation period 20_2, the downlink channel quality is assessed over the second duration 22_2 and second number of measurements 24_2 (not illustrated).

The determined evaluation period changes from the second evaluation period 20_2 to the third evaluation period 20_3 in dependence upon the downlink channel quality falling below the first threshold and remaining above the second threshold.

During the third evaluation period 20_3, the downlink channel quality is assessed over the third duration 22_3 and third number of measurements 24_3 (not illustrated).

The determined evaluation period changes from the third evaluation period 20_3 to the first evaluation period 20_1 in dependence upon the downlink channel quality falling below the second threshold.

The second evaluation period 20_2 has a longer duration 22_2 than a duration 22_1 of the first evaluation period 20_1.

The third evaluation period 20_3 has a shorter duration 22_3 than a duration 22_2 of the second evaluation period 20_2.

In this example, the third evaluation period 20_3 has a longer duration 22_3 than the duration 22_1 of the first evaluation period 20_1.

Thus, in this example, the first evaluation period 20_1 has a shorter duration 22_1, the second evaluation period 20_2 has a longer duration 22_2, and the third evaluation period 20_3 has an intermediate duration 22_3 between the longer duration 22_2 and the shorter duration 22_1. The third evaluation period 20_3 is longer than the first evaluation period 20_1 but shorter than the second evaluation period 20_2—this maintains relaxation but in a less relaxed from.

In some examples, the apparatus 10 is configured to determine a number 24 of downlink measurements for an evaluation period 20; and determine a duration 22 for an evaluation period 20 for performing the determined number 24 of downlink measurements.

The apparatus can then perform the downlink channel quality assessment by performing the determined number 24 of downlink measurements during the determined duration 22 of the evaluation period 20.

The third evaluation period 20_3 can have a longer duration 22 than the first evaluation period 20_1 and/or fewer measurements than the first evaluation period 20_1 and/or the second evaluation period 20_2.

The apparatus 10 can be configured to: use a longer duration 22_2 based on downlink channel quality exceeding a first threshold;

use a shorter duration 22_1 based on downlink channel quality not exceeding a second threshold, lower than the first threshold;

use an intermediate duration 22_3 based on downlink channel quality exceeding the second threshold but not exceeding the first threshold.

The apparatus 10 can be configured to: use a second number 24_2 of downlink measurements based on downlink channel quality exceeding the first threshold;

and use a different third number 24_3 of downlink measurements based on downlink channel quality not exceeding the first threshold but exceed the second threshold, lower than the first threshold.

In some examples, the number of measurements 24_2, 24_3 and the duration 22_2, 22_3 are determined to maintain a longer duration 22 (than the first duration 22_1) while changing the number of measurements 24. For example, in the transition from using the second evaluation period 20_2 to using the third evaluation period 20_3 the number of measurements 24_2, 24_3 and the duration 22_2, 22_3 are determined to maintain a longer duration 22 (than the first duration 22_1) while reducing the number of measurements 24 (compared to the second number 24_2 of measurements).

In some examples, the number of measurements 24 used for a particular evaluation period 20 is varied in dependence on performed downlink channel quality.

In some examples, the duration 22 used for a particular evaluation period 20 is varied in dependence on performed downlink channel quality.

FIGS. 7 and 8 are further examples of FIGS. 5 and 6 respectively, in which the number of measurements 24 is illustrated and is variable. In the examples of FIGS. 7 and 8, the third evaluation period 20_3 has fewer measurements 24 than the first evaluation period 20_1. The third number 24_3 of measurements is less than the first number 24_1 of measurements.

In FIG. 8, the first evaluation period 20_1 and the second evaluation period 20_2 are configured for performing more measurements than the third evaluation period 20_3. The first evaluation period 20_1 and the second evaluation period 20_2, in this example, use the same number of measurements 24 being higher than the number of measurements 24_3 used in the third evaluation period 20_3.

In FIG. 8, the second evaluation period 20_2 and the third evaluation period 20_3 have the same regular fixed periodicity of measurement, being higher (longer period, lower frequency) than the periodicity of measurements used in the first evaluation period 20_1. However, as previously described in other examples the measurements are not at a fixed regular periodicity.

FIG. 9 is an example of FIG. 5, in which the number of measurements 24 is illustrated and fixed.

The first number 24_1, the second number 24_2, and the third number 24_3 of measurements are the same.

The third evaluation period 20_3 has a duration 22_3 that is longer than a duration 22_1 of the first evaluation period 20_1 and shorter than a duration 22_2 of the second evaluation period 20_2.

FIG. 10 illustrates an example of a method 500 for controlling downlink channel quality assessment.

At block 502, the method 500 comprises determining an evaluation period 20, wherein the determined evaluation period 20 can be at least a first evaluation period 20_1, a second evaluation period 20_2 or a third evaluation period 20_3.

At block 504, the method 500 comprises performing downlink channel quality assessment comprising performing downlink measurements during the determined evaluation period 20.

The second evaluation period 20_2 has a longer duration 22_2 than the first evaluation period 20_1 and the third evaluation period 20_3 has a shorter duration 22_3 than the second evaluation period 20_2.

It will be appreciated from the foregoing description that the second evaluation period 20_2 and the third evaluation period 20_3 are relaxed evaluation periods (compared to the first evaluation period 20_1). The second evaluation period 20_2 and the third evaluation period 20_3 are lower power consumption states that enable power saving at the apparatus 10 (the user equipment). In particular, the third evaluation period 20_3 keeps the apparatus in relaxation measurement while avoiding too long a latency in detecting changes to downlink channel quality.

The downlink channel quality assessment can occur at a UE 10 during connected mode but the method is not limited to connected mode. It can, for example, be used for radio link monitoring and/or beam failure detection.

The measurements performed can be measurement of any suitable quality parameter for the downlink channel. The number 24 of measurements performed across a duration 22 can be used to assess the downlink channel quality. In some examples, the number 24 of measurements performed across a duration 22 can be averaged or otherwise processed to provide the assessment.

Suitable quality parameters include but are not limited to: Received Signal Strength Indicator (RSSI), Reference Signal Received Power (RSRP), Reference Signal Received Quality (RSRQ), Signal to Interference plus Noise Ratio (SINR), Signal to Noise plus Interference Ratio (SNIR), Signal to Noise Ratio (SNR), Bit error rate (BER), Block error rate (BLER).

The UE 10 can assess the downlink channel quality based on reception of channel state information reference signal (CSI-RS) and/or synchronization signal block (SSBs).

The UE 10 can limit assessment to the downlink channel—the active downlink (DL) band width part (BWP).

In RRC_CONNECTED, the UE 10 performs Radio Link Monitoring (RLM) in the active BWP based on reference signals (SSB/CSI-RS). The UE 10 monitors the downlink link quality based on the reference signal in the configured RLM-RS resource(s) in order to detect the downlink radio link quality of the PCell and PSCell. The configured RLM-RS resources can be all SSBs, or all CSI-RSs, or a mix of SSBs and CSI-RSs. The UE is not required to perform RLM outside the active DL BWP.

On each RLM-RS resource, the UE shall estimate the downlink radio link quality and compare it to the thresholds Qout and Qin for the purpose of monitoring downlink radio link quality of the cell.

The threshold Qout is defined as the level at which the downlink radio link cannot be reliably received and shall correspond to the out-of-sync block error rate (BLERout)

The threshold Qin is defined as the level at which the downlink radio link quality can be significantly more reliably received than at Qout and shall correspond to the in-sync block error rate (BLERin)

The out-of-sync block error rate (BLERout) and in-sync block error rate (BLERin) are signaled by higher layers.

UE shall be able to evaluate whether the downlink radio link quality on the configured RLM-RS resource estimated over the last $T_{Evaluate\_out}$ period becomes worse than the threshold Qout within $T_{Evaluate\_out}$ period.

UE shall be able to evaluate whether the downlink radio link quality on the configured RLM-RS resource estimated over the last $T_{Evaluate\_in}$ period becomes better than the threshold Qin within $T_{Evaluate}$ period.

Beam Failure Detection is similar. The UE 10 assesses the downlink link quality of a serving cell based on the reference signal in the set q0 in order to detect beam failure instance. The RS resources in the set q0 can be periodic CSI-RS resources and/or SSBs. UE is not required to perform beam failure detection outside the active DL BWP.

In some examples, the first threshold (Threshold1) and/or the second threshold (Threshold2) can be based on the threshold Qin for in-sync detection and/or the threshold Qin for out-of-sync detection. For example, in some examples Threshold1=Qout+X, where X=10 dB or X=(Qin−Qout)+margin. The first threshold can be greater than Qin. For example, in some examples Threshold2>=Qout (Qout<Qin). The second threshold can be less than Qin and greater than Qout.

In some examples, the first duration 22_1 is multiplied by a factor K to provide the second duration 22_2 where K>1 e.g. K=2.

In some examples, the first duration 22_1 is multiplied by a factor $K_{mid}$ to provide the third duration 22_3 where $K > K_{mid}$. In some examples, $K_{mid} < 1$. In some examples, $K_{mid} = 1$.

K and/or $K_{mid}$ can be configured by the network or predefined in the specification.

In some examples, the duration 22_3 is determined based on the downlink radio link quality being monitored. For example, a step-wise change in duration 22_3 can be applied when the radio link quality is degrading every XdB from Threshold1 until dB Threshold2.

In one example, illustrated in FIGS. 7 & 8, the UE 10 shall evaluate whether the downlink radio link quality on the configured RLM-RS resource estimated over the last $T_{Evaluate\_in\_mid}$ [ms] duration 22_3 remains better than the Threshold2 within $T_{Evaluate\_in\_mid}$ [ms] duration 22_3 which is shorter than $T_{evaluate\_in\_relax}$ 22_2.

The UE 10 shall be able to evaluate whether the downlink radio link quality on the configured RLM-RS resource estimated over the last $T_{Evaluate\_out\_mid}$ [ms] period becomes worse than the Threshold2 during the $T_{Evaluate\_in\_mid}$ [ms] evaluation period which is also shorter than $T_{evaluate\_in\_relax}$.

At the beginning of T1, the UE 10 evaluates if the downlink radio link quality is better than Threshold1, therefore the good cell quality criteria is fulfilled and hence the UE starts relaxed measurements for RLM. During the relaxed RLM measurement period the UE 10 monitors the RLM-RSs less often hence the power saving can be achieved. During the relaxation of the RLM measurements, at the second evaluation period 20_2, the $T_{Evaluate\_in\_relax}$ duration 22_2 is applied by multiplying a scaling factor K=2 over the evaluation period in normal measurement mode.

At the beginning of T2, the channel quality drops. The UE 10 may detect the SINR becomes worse than Threshold1 (i.e. the entering criteria not fulfilled) no later than the time of ($T1+T_{Evaluate\_in\_relax}$).

The UE shall keep the relaxed measurements by transitioning to the third evaluation period 20_3 in which the UE 10 applies a $T_{Evaluate\_in\_mid}$ duration 22_3 to estimate the channel quality, where $T_{Evaluate\_in\_mid}$ is shorter than $T_{Evaluate\_in\_relax}$.

At the end of T2, the channel quality further drops. As the UE 10 applies a shorter evaluation period 22_3, it is able to detect the SINR becomes worse no later than the time ($T1+T2+T_{Evaluate\_in\_mid}$). So, the exit criteria can be declared to be fulfilled and the UE will completely exit from the relaxed measurements and revert back to normal RLM measurements with less latency that from the second i.e., evaluation period 20_2.

The speed of decision in the third evaluation period 20_3, is faster compared to in the second evaluation period 20_2 because $T_{Evaluate\_in\_mid}$<T Evaluate_in_relax.

Figure 11:
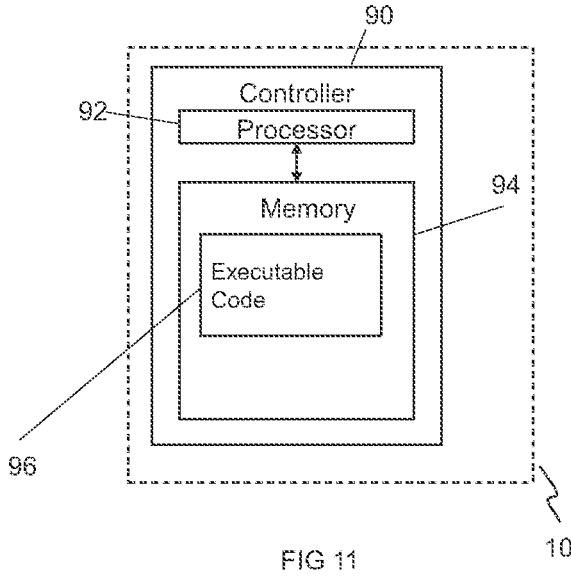
FIG. 11 shows another example of the subject matter described herein.

The UE 10 does not exit from relaxed measurements when entering criteria (to the second evaluation period 20_2) is no longer fulfilled FIG. 11 illustrates an example of a controller 90 for the apparatus 10. Implementation of a controller 90 may be as controller circuitry. The controller 90 may be implemented in hardware alone, have certain aspects in software including firmware alone or can be a combination of hardware and software (including firmware).

As illustrated in FIG. 11 the controller 90 may be implemented using instructions that enable hardware functionality, for example, by using executable instructions of a computer program 96 in a general-purpose or special-purpose processor 92 that may be stored on a computer readable storage medium (disk, memory etc) to be executed by such a processor 92.

The processor 92 is configured to read from and write to the memory 94. The processor 92 may also comprise an output interface via which data and/or commands are output by the processor 92 and an input interface via which data and/or commands are input to the processor 92.

The memory 94 stores a computer program 96 comprising computer program instructions (computer program code) that controls the operation of the apparatus 10 when loaded into the processor 92. The computer program instructions, of the computer program 96, provide the logic and routines that enables the apparatus to perform the methods illustrated in the Figs. The processor 92 by reading the memory 94 is able to load and execute the computer program 96.

The apparatus 10 therefore comprises:
at least one processor 92; and
at least one memory 94 including computer program code
the at least one memory 94 and the computer program code configured to, with the at least one processor 92, cause the apparatus 10 at least to perform:
determining an evaluation period, wherein the determined evaluation period can be at least a first evaluation period 20_1, a second evaluation period 20_2 or a third evaluation period 20_3; and
performing downlink channel quality assessment comprising performing downlink measurements during the determined evaluation period,
wherein the second evaluation period 20_2 has a longer duration 22_* than the first evaluation period 20_1
wherein the third evaluation period 20_3 has a shorter duration 22_* than the second evaluation period 20_2.

Figure 12:
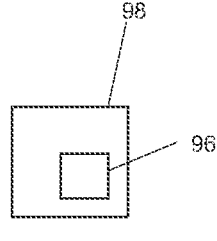
FIG. 12 shows another example of the subject matter described herein.

As illustrated in FIG. 12, the computer program 96 may arrive at the apparatus 10 via any suitable delivery mechanism 98. The delivery mechanism 98 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 96. The delivery mechanism may be a signal configured to reliably transfer the computer program 96. The apparatus 10 may propagate or transmit the computer program 96 as a computer data signal.

Computer program instructions for causing an apparatus to perform at least the following or for performing at least the following:
determining an evaluation period, wherein the determined evaluation period can be at least a first evaluation period 20_1, a second evaluation period 20_2 or a third evaluation period 20_3; and
performing downlink channel quality assessment comprising performing downlink measurements during the determined evaluation period,
wherein the second evaluation period 20_2 has a longer duration 22_* than the first evaluation period 20_1
wherein the third evaluation period 20_3 has a shorter duration 22_* than the second evaluation period 20_2.

The computer program instructions may be comprised in a computer program, a non-transitory computer readable medium, a computer program product, a machine readable medium. In some but not necessarily all examples, the computer program instructions may be distributed over more than one computer program.

Although the memory 94 is illustrated as a single component/circuitry it may be implemented as one or more separate components/circuitry some or all of which may be integrated/removable and/or may provide permanent/semi-permanent/dynamic/cached storage.

Although the processor 92 is illustrated as a single component/circuitry it may be implemented as one or more separate components/circuitry some or all of which may be integrated/removable. The processor 92 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The Figs may represent steps in a method and/or sections of code in the computer program 96. The illustration of a particular order to parts of the Figs does not necessarily imply that there is a required or preferred order and the order and arrangement may be varied. Furthermore, it may be possible for some parts to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. A user equipment comprising:

at least one processor; and at least one memory including computer program code, the at least one memory and the computer program code being configured to, with the at least one processor, cause the user equipment to:

determine an evaluation period for a downlink channel quality assessment, the evaluation period being one of a first evaluation period, a second evaluation period, or a third evaluation period;

perform the downlink channel quality assessment by performing a plurality of downlink measurements during the determined evaluation period and generating a channel quality assessment based on the plurality of downlink measurements performed over a duration of the evaluation period;

configure the first evaluation period to have a first duration and a first number of downlink measurements;

configure the second evaluation period to have a second duration longer than the first duration;

configure the third evaluation period to have a third duration shorter than the second duration and longer than the first duration;

configure the third evaluation period to include fewer downlink measurements than at least one of the first evaluation period and the second evaluation period;

determine the evaluation period based on the channel quality assessment generated for a previously performed evaluation period;

determine the channel quality assessment by comparing the channel quality assessment to a first quality threshold and a lower second quality threshold;

select the second evaluation period in response to the channel quality assessment exceeding the first quality threshold;

change from the first evaluation period to the second evaluation period when the channel quality assessment exceeds the first quality threshold;

maintain operation in the second evaluation period while the channel quality assessment continues to exceed the first quality threshold;

change from the second evaluation period to the third evaluation period when the channel quality assessment fails to exceed the first quality threshold while remaining above the second quality threshold;

change from the third evaluation period to the first evaluation period when the channel quality assessment falls below the second quality threshold;

change from the third evaluation period to the second evaluation period when the channel quality assessment exceeds the first quality threshold;

prevent a transition directly from the second evaluation period to the first evaluation period solely in response to the channel quality assessment no longer exceeding the first quality threshold;

determine, for each evaluation period, both a number of downlink measurements and a duration over which the number of downlink measurements is performed;

apply the second duration based on the channel quality assessment exceeding the first quality threshold;

apply the first duration based on the channel quality assessment falling below the second quality threshold; and apply the third duration based on the channel quality assessment exceeding the second quality threshold and failing to exceed the first quality threshold.

2. The user equipment of claim 1, wherein the downlink measurements comprise: reference signal received power (RSRP), reference signal received quality (RSRQ), signal-to-noise ratio (SNR), signal-to-interference-plus-noise ratio (SINR), bit error rate (BER), or block error rate (BLER).

3. The user equipment of claim 2, wherein the downlink measurements are performed based on reception of at least one of a synchronization signal block (SSB) or a channel state information reference signal (CSI-RS).

4. The user equipment of claim 3, wherein the user equipment limits the downlink channel quality assessment to an active downlink bandwidth part.

5. The user equipment of claim 4, wherein the first quality threshold corresponds to an in-sync detection level and the second quality threshold corresponds to an out-of-sync detection level defined for radio link monitoring.

6. The user equipment of claim 5, wherein each duration of the evaluation period is determined by multiplying a base duration by a scaling factor, the scaling factor being greater for the second evaluation period than for the first evaluation period.

7. The user equipment of claim 6, wherein the scaling factor for the third evaluation period is less than the scaling factor for the second evaluation period and greater than the scaling factor for the first evaluation period.

8. The user equipment of claim 7, wherein the evaluation period is defined by a sliding or overlapping time window of measurements.

9. The user equipment of claim 8, wherein the user equipment performs the downlink channel quality assessment during a connected-mode radio link monitoring procedure.

10. The user equipment of claim 8, wherein the user equipment performs the downlink channel quality assessment during a beam failure detection procedure.

11. The user equipment of claim 10, wherein the second evaluation period and the third evaluation period correspond to reduced-power measurement modes that reduce power consumption relative to the first evaluation period while maintaining responsiveness to channel quality degradation.

12. A method performed by a user equipment, the method comprising:

determining an evaluation period for a downlink channel quality assessment, the evaluation period being one of a first evaluation period, a second evaluation period, or a third evaluation period;

performing the downlink channel quality assessment by performing a plurality of downlink measurements during the determined evaluation period and generating a channel quality assessment based on the plurality of downlink measurements performed over a duration of the evaluation period;

configuring the first evaluation period to have a first duration and a first number of downlink measurements;

configuring the second evaluation period to have a second duration longer than the first duration;

configuring the third evaluation period to have a third duration shorter than the second duration and longer than the first duration;

configuring the third evaluation period to include fewer downlink measurements than at least one of the first evaluation period and the second evaluation period;

determining the evaluation period based on the channel quality assessment generated for a previously performed evaluation period;

determining the channel quality assessment by comparing the channel quality assessment to a first quality threshold and a lower second quality threshold;

selecting the second evaluation period in response to the channel quality assessment exceeding the first quality threshold;

changing from the first evaluation period to the second evaluation period when the channel quality assessment exceeds the first quality threshold;

maintaining operation in the second evaluation period while the channel quality assessment continues to exceed the first quality threshold;

changing from the second evaluation period to the third evaluation period when the channel quality assessment fails to exceed the first quality threshold while remaining above the second quality threshold;

changing from the third evaluation period to the first evaluation period when the channel quality assessment falls below the second quality threshold;

changing from the third evaluation period to the second evaluation period when the channel quality assessment exceeds the first quality threshold;

preventing a transition directly from the second evaluation period to the first evaluation period solely in response to the channel quality assessment no longer exceeding the first quality threshold;

determining, for each evaluation period, both a number of downlink measurements and a duration over which the number of downlink measurements is performed;

applying the second duration based on the channel quality assessment exceeding the first quality threshold;

applying the first duration based on the channel quality assessment falling below the second quality threshold; and applying the third duration based on the channel quality assessment exceeding the second quality threshold and failing to exceed the first quality threshold.

13. The method of claim 12, wherein the downlink measurements comprise: reference signal received power (RSRP), reference signal received quality (RSRQ), signal-to-noise ratio (SNR), signal-to-interference-plus-noise ratio (SINR), bit error rate (BER), or block error rate (BLER).

14. The method of claim 13, wherein the downlink measurements are performed based on reception of at least one of a synchronization signal block (SSB) or a channel state information reference signal (CSI-RS).

15. The method of claim 14, wherein the user equipment limits the downlink channel quality assessment to an active downlink bandwidth part.

16. The method of claim 15, wherein the first quality threshold corresponds to an in-sync detection level and the second quality threshold corresponds to an out-of-sync detection level defined for radio link monitoring.

17. The method of claim 16, wherein each duration of the evaluation period is determined by multiplying a base duration by a scaling factor, the scaling factor being greater for the second evaluation period than for the first evaluation period.

18. The method of claim 17, wherein the scaling factor for the third evaluation period is less than the scaling factor for the second evaluation period and greater than the scaling factor for the first evaluation period.

19. The method of claim 18, wherein the evaluation period is defined by a sliding or overlapping time window of measurements.

20. The method of claim 19, wherein the user equipment performs the downlink channel quality assessment during a connected-mode radio link monitoring procedure.

* * * * *